United States Patent [19]

Miller et al.

[11] Patent Number: 5,731,823

[45] Date of Patent: Mar. 24, 1998

[54] AUTOMATIC OPTIMIZATION OF HARDCOPY OUTPUT FOR ENHANCED APPEARANCE AND THROUGHPUT

[75] Inventors: Steven O. Miller, Vancouver, Wash.; William J. Allen, Portland, Oreg.

[73] Assignee: Hewlett-Packard Company, Palo Alto, Calif.

[21] Appl. No.: 188,618

[22] Filed: Jan. 27, 1994

[51] Int. Cl.[6] .................................... B41J 29/38
[52] U.S. Cl. ................ 347/5; 358/462; 395/112
[58] Field of Search ..................... 347/43, 19, 5; 382/165, 176, 173, 177; 364/519; 358/462; 395/112

[56] References Cited

U.S. PATENT DOCUMENTS

| | | | |
|---|---|---|---|
| 4,413,275 | 11/1983 | Horiuchi et al. | 358/75 |
| 4,500,919 | 2/1985 | Schreier | 358/78 |
| 4,554,593 | 11/1985 | Fox et al. | 358/282 |
| 4,680,645 | 7/1987 | Dispoto et al. | 358/298 |
| 4,682,190 | 7/1987 | Ikeda | 346/154 |
| 4,683,492 | 7/1987 | Sugiura et al. | 358/80 |
| 4,743,959 | 5/1988 | Frederiksen | 358/11 |
| 4,835,551 | 5/1989 | Ng | 346/108 |
| 4,866,514 | 9/1989 | Yoemans | 358/80 |
| 4,953,013 | 8/1990 | Tsuji et al. | 358/75 |
| 4,974,171 | 11/1990 | Yeh et al. | 364/519 |
| 5,044,796 | 9/1991 | Lund | 400/323 |
| 5,091,734 | 2/1992 | Suzuki et al. | 347/43 |
| 5,131,075 | 7/1992 | Wilkes et al. | 395/105 |
| 5,146,547 | 9/1992 | Beck et al. | 395/116 |
| 5,168,552 | 12/1992 | Vaughn et al. | 315/109 |
| 5,243,691 | 9/1993 | Kuwabara et al. | 395/112 |

FOREIGN PATENT DOCUMENTS 0390473  3/1990  European Pat. Off. .

OTHER PUBLICATIONS

"Adobe Strikes Back in Language Battle with New Web-Savvy PostScript Level 3", The Hard Copy Observer, vol. VI, No. 9., Sep. 1996, pp. 1, 24–26.

EPO Patent Application 029105, Filed Jun. 9, 1988, "Image Processing Method and Apparatus Therefor," Nao Nagashima, et al.

EPO Patent Application 0323265, Filed Dec. 29, 1988, "Method of Processing Color Image and Apparatus Therefor," Akio Suzuki, et al.

Hewlett–Packard Journal, Aug. 1992, "Low–Cost Plain–Paper Color Inkjet Printing", pp. 64–68; Daniel A. Kearl and Michael S. Ard.

Hewlett–Packard Journal, Aug. 1992, "Ink and Print Cartridge Development for the HP DeskJet 500C/DeskWriter C Printer Family", pp. 69–76; Craig Maze, Loren J. Johnson, Daniel A. Kearl and James P. Shields.

Hewlett–Packard Journal, Aug. 1992, "HP DeskWriter C Printer Driver Development", pp. 93–102; William J. Allen, Toni D. Courville, and Steven O. Miller.

*Primary Examiner*—Benjamin R. Fuller
*Assistant Examiner*—Juanita Stephens
*Attorney, Agent, or Firm*—Flory L. Martin

[57] ABSTRACT

A method of automatically optimizing the controllable parameters related to producing printed material on a hardcopy output device is provided, along with a hardcopy output device configured for implementing this method. Users require different types of printed objects to have different characteristics. Specifically, business graphics need to be sharp and vivid, photographic images should look realistic, and text must be black, crisp and clear. By extracting, analyzing and conditioning data generated during a printing stream, the various regions of text, graphics and photographic images on a sheet are distinguished, characterized, and printed with a custom balancing of color pleasing to the human eye for each type of image printed.

24 Claims, 6 Drawing Sheets

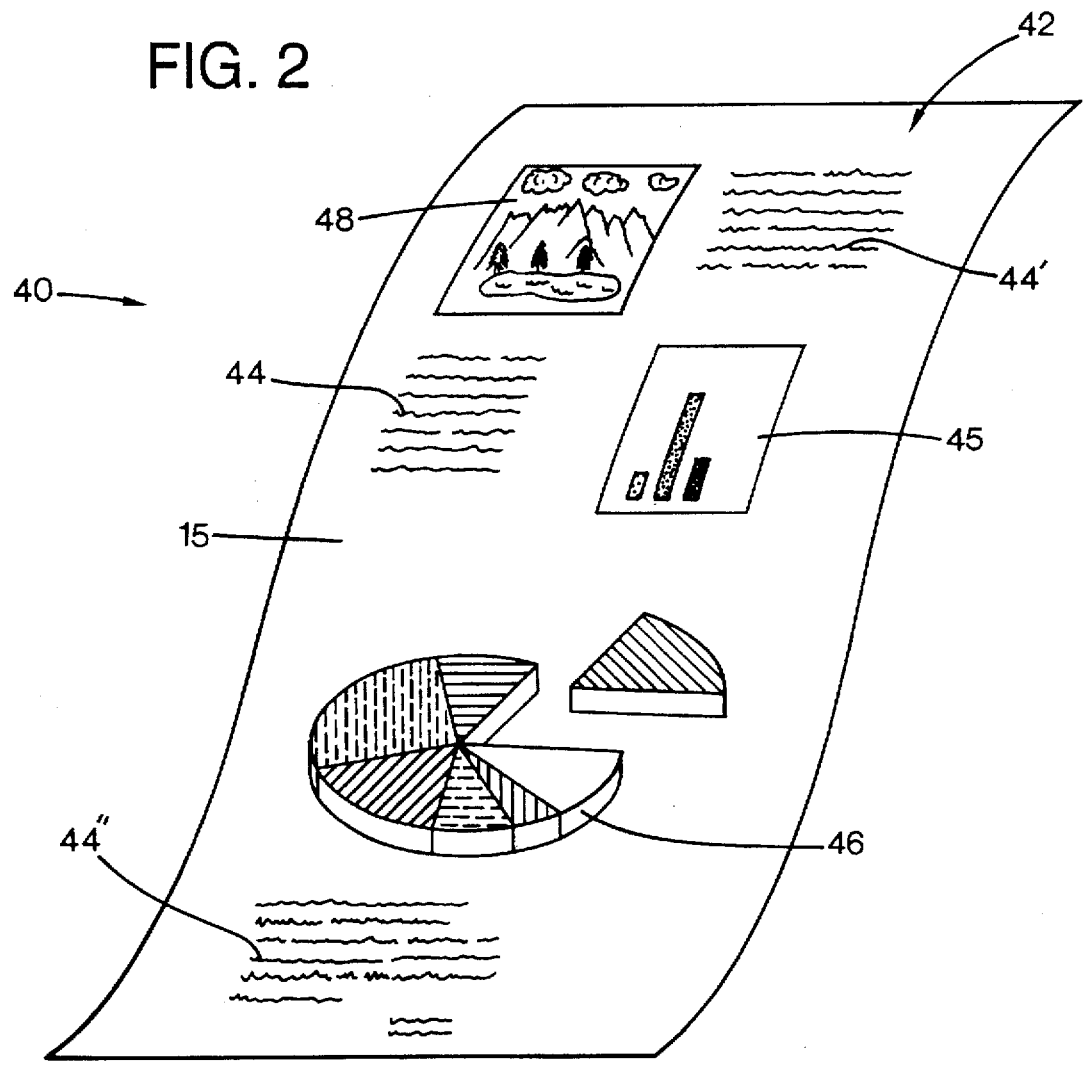

5,731,823

AUTOMATIC OPTIMIZATION OF HARDCOPY OUTPUT FOR ENHANCED APPEARANCE AND THROUGHPUT

FIELD OF THE INVENTION

The invention relates generally to a method of automatically optimizing the controllable parameters related to producing printed material on a hardcopy output device, and such a device implementing this method.

BACKGROUND OF THE INVENTION

The term "hardcopy output device" includes a variety of printers and plotters, including those using thermal inkjet and electrophotographic technologies to apply an image to a hardcopy medium, such as paper, transparencies, foils, and the like.

Most earlier hardcopy print devices have parameters that balance the competing requirements of throughput, typically measured in pages per minute, and the print quality of the hardcopy output. These parameters also control the rendering of the document into both the graphics format and hardware configuration of the particular device. However, the optimum settings for these parameters often varies for different types of documents. For example, documents with only black ink text have a different set of optimum parameters than documents with colored images or business graphics.

Most hardcopy print devices have a variety of mechanical print modes and rendering or halftoning options that affect the throughput and output quality. This is especially true for current color printers based on inkjet technology. These modes are often under the user's direct control, or they are set to default values calculated to provide only adequate quality output and throughput for the overall image. In this default mode, the earlier devices typically had parameters selected to optimize the most typical type of document they produced, while delivering only acceptable results when printing other types of documents.

When under user control, in theory, the operator optimizes the printing parameters through trial and error. While an experienced operator may eventually determine the relationships between each printing parameter and its effects on the various types of outputs, this rarely happens. Most operators never master an understanding of the complex relationship between the numerous controllable printing parameters and the quality of the output. Indeed, only experts experienced in the rendering and printing technology of a particular hardcopy device have a good chance of selecting the optimum printing parameters, but this task is quite labor intensive.

Moreover, in the vast majority of earlier color matching techniques, it was impossible to vary the print mode settings on a page by page basis, or for different elements on a single page. Thus, the physical capabilities of hardcopy print devices are rarely exercised by the vast majority of operators. As a result, often the printed output is of far lower quality, and with less throughput, then could have been achieved under optimal operating conditions.

For example, consider a sheet containing text, a business chart, and a photographic image. When color matching was optimized for the photograph, the business chart suffered a loss of vivid color graphics. If instead, the color settings for the page were adjusted to deliver a brighter, more saturated graphic, then the photographic image lost its lifelike appearance. Thus, for the main stream operator using the earlier hardcopy devices, optimal hardcopy results were rarely if ever achieved.

SUMMARY OF THE INVENTION

According to one aspect of the present invention, a method is provided of controlling the printing of a hardcopy using a hardcopy printing device having print characteristics. The method includes the steps of supplying a printing medium to a printing device and instructing the printing device to print a selected image having plural elements on the medium. In a distinguishing step, each element is distinguished, and in response to this distinguishing step, an adjusting step adjusts the instructing step. In an illustrated embodiment, the image elements may be distinguished as being either textual, grayscale only, color graphic or photographic images, with the instructing step being adjusted to generate a hardcopy output having crisp, clear text and grayscale images, sharp, vivid color graphics, and lifelike photographic images.

According to another aspect of the present invention a hardcopy print device is provided for implementing such a method. In an illustrated embodiment, the hardcopy print device comprises an inkjet printer.

An object of an aspect of the present invention is to provide a method and hardcopy print device that are easy to operate, and which use the full color mixing and matching capabilities of the print device to provide an optimal hardcopy output.

Another object of an aspect of the present invention is to provide a color hardcopy which is more vibrant, clear, and pleasing to the eye than that obtainable with earlier systems.

An additional object of an aspect of the present invention is to provide a method and hardcopy print device that discriminates between various types of printed images, such as textual, grayscale only, color graphic and photographic images, and which selects black and color inks in mixtures to yield a preferred color reproduction which is pleasing to the eye, although not necessarily matching the color displayed on an associated computer monitor.

A further object of an aspect of the present invention is to provide an improved method of balancing the color requirements for different components of a selected image on a component by component basis, using computer software with minimal operator input.

BRIEF DESCRIPTION OF THE DRAWINGS

FIG. 2 is a plan view of one form of a hardcopy output, having textual, grayscale only, color graphic and photographic image components, produced according to the present invention.

DETAILED DESCRIPTION OF A PREFERRED EMBODIMENT

Figure 1:
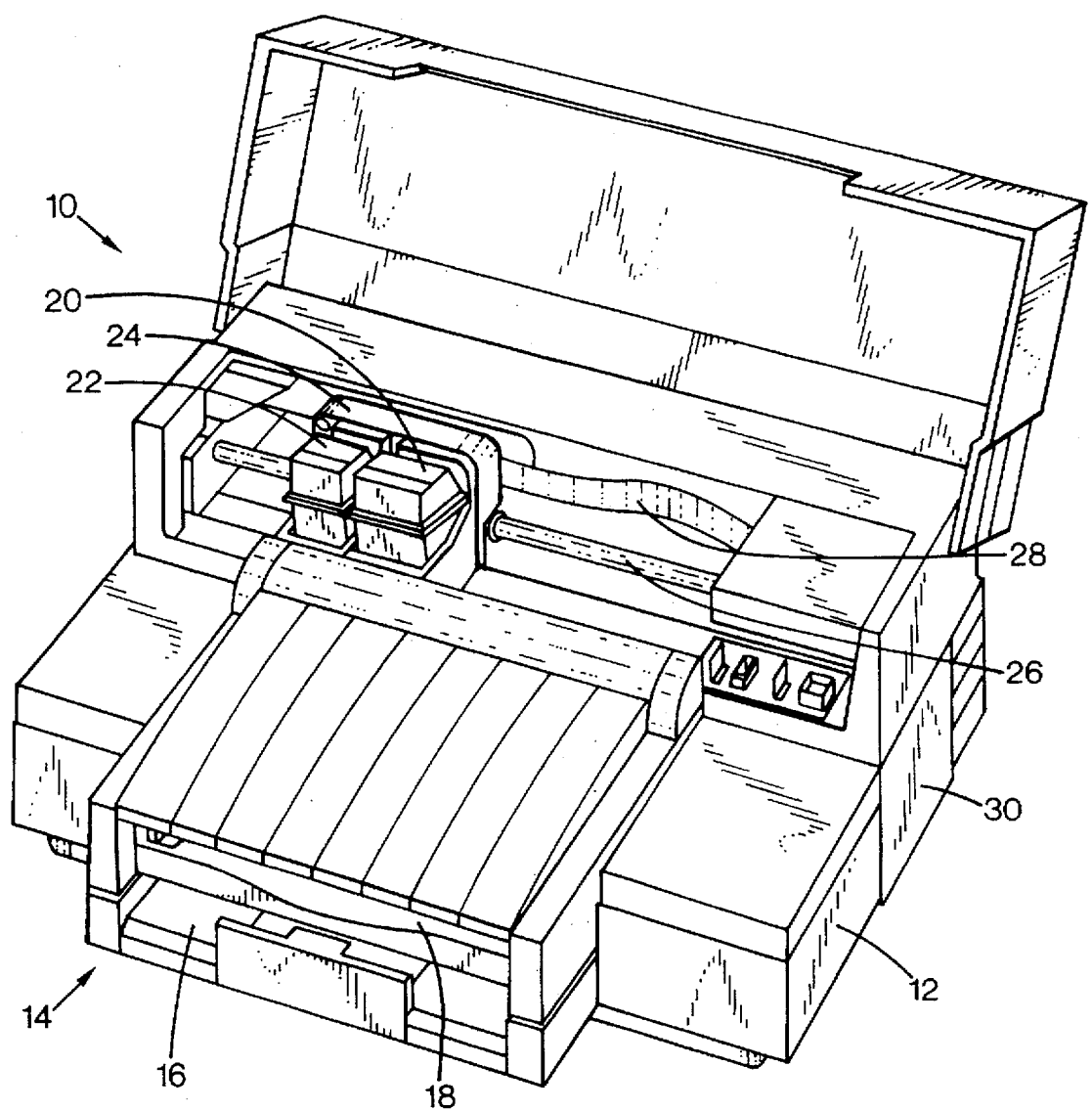
FIG. 1 is a perspective view of one form of a hardcopy output device, specifically, an embodiment of an inkjet printer, of the present invention.

FIG. 1 illustrates an embodiment of a hardcopy printing device, here an inkjet printer 10, which may be used in an office or home environment for business reports, correspondence, desktop publishing, and the like. While it is apparent that the printer components may vary from model to model, the typical inkjet printer 10 includes a chassis 12 and a print medium handling system 14 for supplying a print medium, such as a sheet of paper 15 (FIG. 2), to the printer 10. In addition to paper 15, the print medium may be any type of suitable sheet material, such as card-stock, transparencies, mylar, foils, and the like, but for convenience, the illustrated embodiment is described using paper as the print medium. The print medium handling system 14 includes a feed tray 16, an output tray 18, and a series of rollers (not shown) for delivering the sheets of paper from the feed tray 16 into position for receiving ink from an inkjet cartridge, such as a color ink cartridge 20—and/or a black ink cartridge 22. The illustrated color cartridge 20 is a tri-color pen, although in some embodiments (not shown), a group of discrete monochrome pens may be used, or a single monochrome black pen 22 may be used.

The cartridges or pens 20, 22 are transported by a carriage 24 which may be driven along a guide rod 26 by a conventional drive belt/pulley and motor arrangement (not shown). The pens 20, 22 may be conventional pens, which selectively deposit one or more ink droplets on a sheet of paper 15 in accordance with instructions received via a conductor strip 28 from a printer controller 30 located within chassis 12, for instance at the location shown in FIG. 1. The controller 30 generally receives instructions from a computer (not shown), such as a personal computer. A monitor (not shown) coupled to the computer may be used to display visual information to an operator, such as the printer status or a particular program being run on the computer. Personal computers, their input devices, such as a keyboard and/or a mouse device (not shown), and monitors are all well known to those skilled in the art.

FIG. 2 illustrates an example of a hardcopy output 40 comprising the sheet medium, here paper 15, which has a selected image 42 printed thereon. The computer operator may select, create and/or edit the image 42 on the computer monitor prior to printing. The image 42 may include a plurality of components, elements or regions, such as: textual elements 44, 44' and 44" (referred to herein generally as "text 44" unless otherwise noted); a grayscale region, such as a business graphic bar chart 45, which has several data bars printed in different shades between black and white; a color business graphic region, such as a sectioned pie chart 46; and a photorealistic or photographic color component, such as a scenic image 48. Other elements may also benefit from being distinguished and processed, as described further below, such as line art used in engineering and architectural drawings.

As mentioned in the Background portion above, in the past when a variety of different image types appeared on a single page, the earlier color adjustment schemes yielded unsatisfactory results. In earlier systems, if the hardcopy output 40 were skewed to provide accurate color for the photographic image 48, then the vivid color of the graphics 46 would be washed out, whereas if the printer was skewed toward a saturated vivid color for the graphic, the photographic image 48 would lose its lifelike appearance. Alternatively, these earlier print systems 40 allowed users to manually adjust the colors, as well as balance quality and throughput requirements, in an attempt to provide visually appealing images. In reality, very few people ever attained this level of sophistication or had the time to implement it on a regular basis.

Another difficulty in manually adjusting the colors results from using a computer monitor as the composing medium. Color is formed in a totally different manner on a computer screen than on a printed page. Computer monitors display colors that are combinations of red, green and blue light (RGB). The monitor displays the light rays of these primary colors which are then mixed by the human eye in an additive fashion and interpreted as a multicolor screen. These RGB colors are considered to be additive because their sum in balanced amounts is interpreted by the human eye as white light.

In contrast, a printer forms colors on a print medium via a "subtractive" mixing of cyan, magenta, yellow and black (CMYK). The cyan, magenta and yellow colors are considered subtractive because they each absorb all light rays except those of the specific color produced. The letter "K" represents "true" black provided by pen 22, as opposed to a composite black formed by the sum of cyan, magenta and yellow in balanced amounts, such as by color pen 20. Another significant distinction between monitors and hardcopy outputs 40 is the manner in which the various gradations of colors are formed. A monitor provides a relative continuum of color levels using the RGB components (e.g. 256 or more variations), whereas the hardcopy printer 10 may have only discrete color control provided by selectively placing as few as three colors (cyan, magenta and yellow) on the sheet 15.

In the past, color matching schemes attempted to produce a hardcopy output which had colors matching those appearing on the computer monitor. This "what you see is what you get" ("WYSIWYG") operational philosophy provided hardcopy outputs which were not visually pleasing. Independent research contracted by the assignee of this patent application discovered two important concepts that challenged this traditional WYSIWYG assumptions. First, the hardcopy output 40, not the screen image, is considered to be the critical measurement of the users work. Second, while color matching between the printer and screen is important, users consistently preferred that the hardcopy 40 have brighter more vivid colors, rather than less vivid, perfectly-screen-matched colors. Users also demand that graphics 46 be vibrant, and photographic images 48 be natural and lifelike, even when they both appear on the same page.

Figure 3A:
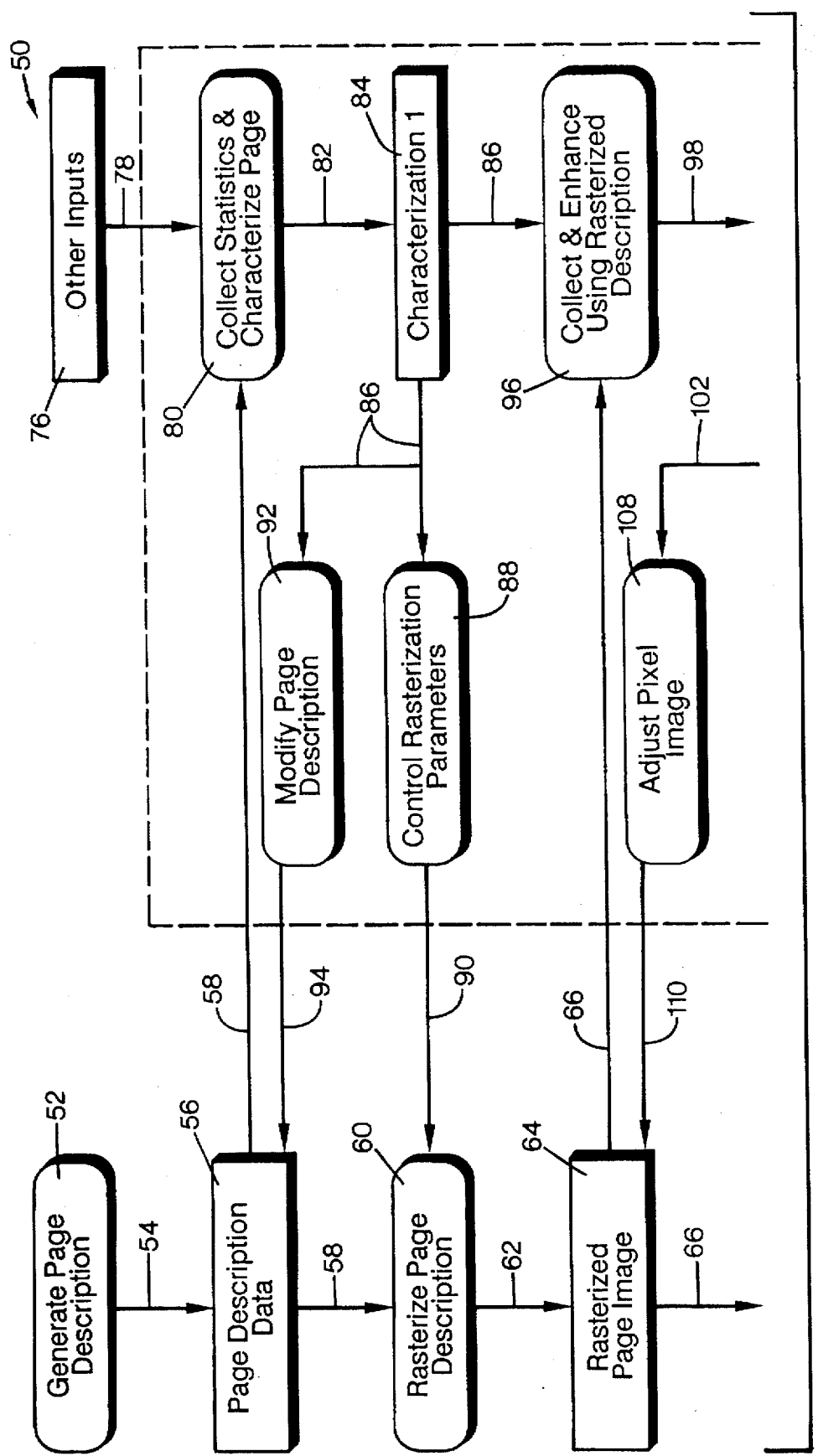
FIGS. 3A and 3B, (collectively, "FIG. 3") comprise a flow diagram illustrating one form of the method of the present invention.
Figure 3B:
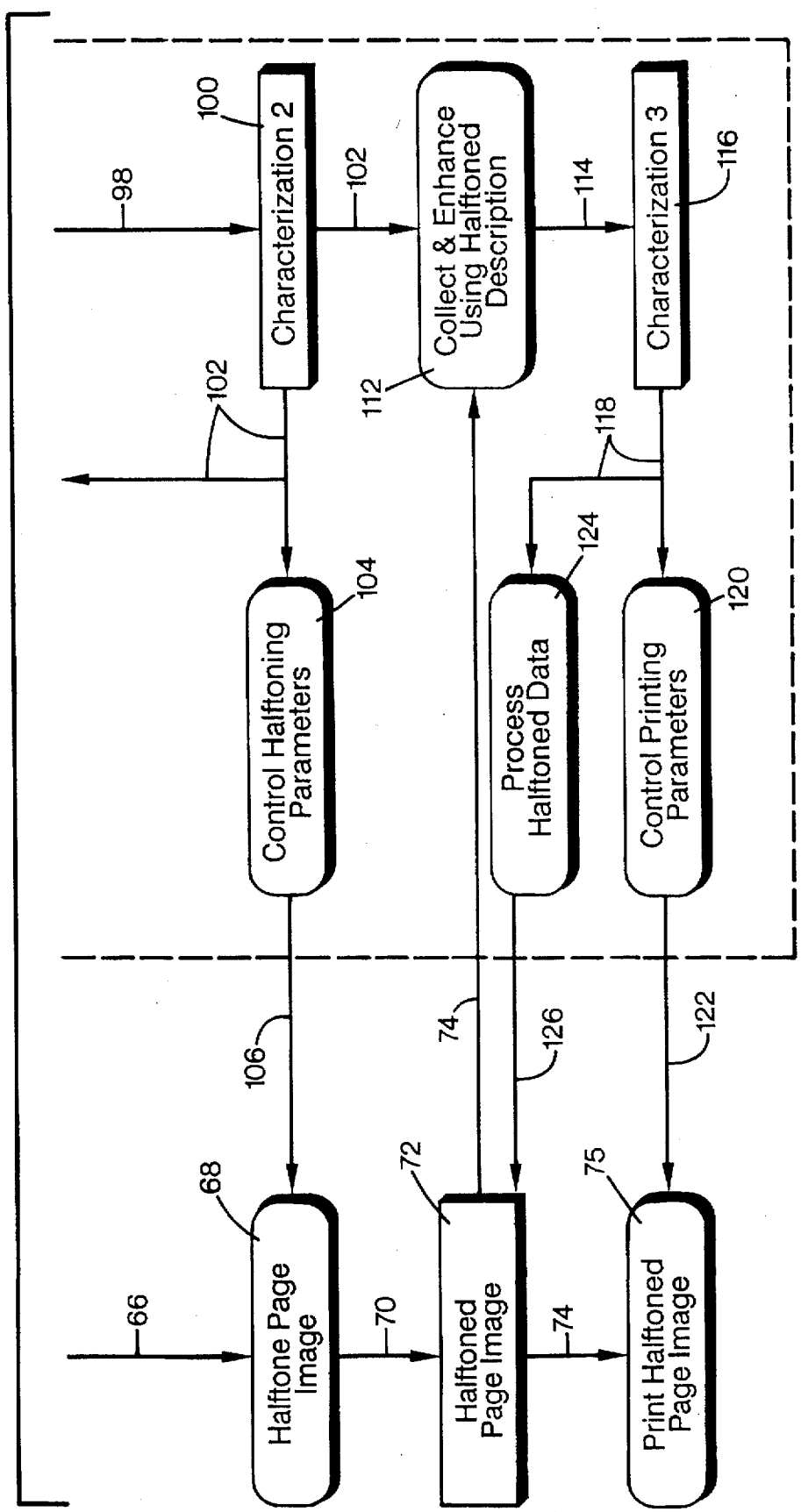

To accommodate these competing desires, the printer 10 incorporates a method of operating the controller 30 which is illustrated with reference to flow chart 50 in FIGS. 3A and 3B (collectively, "FIG. 3"). Generation of the hardcopy output 40 from a computer file or screen display typically involves several steps. These steps may occur in a printer driver (not shown) residing in the host computer, in the software contained in the printer 10, in the printer hardware itself, or in any combination of these locations. For example, if the printer has the capability of rasterizing a page description, such as an Adobe Systems, Inc. PostScript® printer, or it has the capability of halftoning the rasterized page description, the printing process of flow chart 50 may occur partially or entirely within the printer 10. In any case, at one stage in the process, data defining the selected image 42 is transmitted from the host computer to the printer hardware (e.g., the printer pens 20, 22, the drive mechanism for controlling carriage 24, and the paper handling system 14) and the image 42 is printed on sheet 15.

The types of data transmitted from the computer to the printer 10 typically varies depending upon the types of image components under consideration. For example, the textual components 44 may be transmitted as bit-mapped data or ASCII text characters, while the photographic image 48 is typically transmitted as bit-mapped or pixel-mapped data. The graphs 45 and 46 are generally rectilinear objects, and may be transmitted as bit-mapped data or as geometric shapes in a mathematical format with definitions for pattern, fill type, arcs, etc., together with boarder locations, thickness, titles and the like.

Thus, in general the printed image components (textual 44, grayscale 45, color graphic 46, or photographic 48) may distinguished based upon the data format received by the printer 10 from the computer. It is apparent that occasionally there will be exceptions, such as graphs 45, 46 which have been constructed by the user through bit-map or pixel-map techniques, which may then be interpreted as photographic images. Alternatively, each bit-map may be analyzed to determine its composition, such as by spatial frequency analysis and/or determination of the number of unique colors. However, the vast majority of people form business charts 45, 46 using graphics programs, as opposed to bit-map programs, so on a practical basis, any confusion of graphics as photographic images is expected to be minimal.

Flow diagram 50 illustrates an embodiment of a method of the present invention using printer 10 in an environment provided by Apple Computer, Inc.'s QuickDraw® graphics language. The illustrated printer 10 is Hewlett-Packard Company's DeskWriter® 560C model inkjet printer, which has four stages for generating the hardcopy output 40. In the first stage, in a page generating step 52, a page description is generated, for example, by a user or a software application using a high level graphics language, such as the PostScript® graphics language sold by Adobe Systems, Inc., or Apple Computer, Inc.'s QuickDraw® graphics primitives (shown in the illustrated embodiment). The generating step 52 produces an output data stream signal 54 which may be accumulated as page description data 56.

A page description signal 58, representative of the accumulated data 56, comprises an input to the second stage, a rasterizing page description step 60. This rasterizing step 60 may be conducted in a variety of conventional manners known to those skilled in the art. For example, the rasterizing step may include choosing a resolution which yields a selected optimum balance of throughput and print quality. Alternatively, these parameters may be supplied as user or printer inputs, as discussed further below. A data stream signal 62 output of the rasterizing step 60 may be accumulated as rasterized page image data 64.

The rasterized data 64 may be supplied as a rasterized data signal 66 to the third stage for generating the hardcopy output 40, a halftoning step 68 for halftoning the page image. The halftoning step 68 may be accomplished in a variety of conventional manners known to those skilled in the art, including processes such as halftoning to different pixel depths, or those required to support different hardware printing modes. A data stream signal 70 output of the halftoning step 68 may be complied as halftoned page image data 72.

A halftoned data signal 74 represents the halftoned data 72, and is supplied to the fourth stage, a final printing step 75. This printing step 75 may be translated by a portion of controller 30 into instruction signals recognizable to the printer hardware to drive the paper handling system 14, the pen carriage 20, and the pens 20, 22 to selectively apply black and color inks to the print medium 15 to compose the selected image 42. It is apparent to those skilled in the art that other hardcopy print devices may have more or less steps than the four stages 52, 60, 68 and 75 illustrated. The concepts illustrated by FIG. 3, and as described further below, may be modified accordingly to accommodate the varying number of printer steps involved for a specific hardcopy printing device.

In addition to the page description 52, other inputs may be provided to the illustrated embodiment of FIG. 3. While the rasterizing step 60 may select a resolution which balances throughput and print quality, these parameters may be supplied as other inputs 76, such as user or printer inputs supplied as an input signal 78. For example, a user may select the print quality as "best," "normal" or "draft," with corresponding tradeoffs of lesser or greater throughputs, respectively. Another user input may be the type of print medium. Alternatively, these inputs 76 may be provided totally or in part by the computer, for instance, the type of print media 15 or pens 20, 22.

In the illustrated embodiment of FIG. 3, the various types of data generated during the printing operation, here data 56, 64 and 72, are extracted and conditioned, then injected into subsequent stages of the printing process, or used to alter the original data. Alternatively, this data may be extracted, modified, and then processed according to subsequent steps. In the illustrated embodiment for printer 10, there are three such data extraction and conditioning segments, which may be linked together as shown. While the illustrated embodiment interacts at each stage 52, 60, 68 and 75, interaction at less than all of the available stages may also be useful in some implementations.

The first data extraction is the page description signal 58, which is supplied to a page statistics collecting and characterizing step 80. In step 80, the page description data 56 is collected as statistics concerning the selected image 42. The statistics collected on the page description may be characterized by the type of geometric objects on the page, such as graphics 45, 46, and their attributes, such as size, border color, fill color, line thickness, and the like. Other statistics may include information on how text 44 is used on the page, as well as the text attributes, such as text size, color and spacing. It is often useful to gather other information, such as whether text is next to, or on top of colored regions.

Additional statistics collected and characterized in step 80 may include the presence of any scanned images 48, which often represent photographs. Other statistics regarding the selected image 42 may include recording which black objects touch color objects, which regions contain only black objects, and which regions contain a mixture of black and color objects that touch each other. This information may be useful for bleed control on CMYK printers that have negative interactions between the black (K) and color (CMY) inks. At this initial collecting step 80, statistics may also be gathered to define the bounding areas of regions having objects that would benefit from different post rasterizing techniques. For instance, business charts 45, 46 may benefit from halftoning techniques differing from those used on the scanned photograph 48.

Beyond characterizing certain features of the components 44, 45, 46 and 48, step 80 may also characterizes image 42 according to the subsequent steps which may be employed in certain regions. For instance, step 80 may characterize the type of post processing the photographic region 48 requires if it is slightly out of focus and could benefit from sharpening. Also, a low resolution photograph may benefit from resolution enhancement or synthesis techniques. Color balance and contrast are further examples of statistics which may be measured and characterized in step 80 for later correction.

In step 80, it may also be useful in controlling subsequent image processing variables, to determine whether image 48 is actually a scanned photograph or a synthetic computer generated image. The number and types of colors used on the page may be counted in step 80 to take advantage of rendering the page at the lowest possible pixel depth for maximum throughput, or if only neutral (gray) colors 45 are detected, the page may be treated by printer 10 as a grayscale page rather than a color page to maximize both quality and throughput.

When printing one or a sequence of plural hardcopy pages, step 80 may also collect statistics for each page as a whole, such as the number of elements, or the number of color elements on each page. Upon completion of all or portions of step 80, an output signal 82 carries the characterized data output of step 80 for accumulation as first characterization data 84.

This first characterization data 84 is supplied by signal 86 to a controlling rasterization parameters step 88. In the controlling step 88, the first characterization data 86 is used to generate a rasterization control signal 90, which is then supplied as an input to the rasterizing page description step 60. The first characterization data 86 may also be supplied to a modifying page description step 92.

In the modifying step 92, the first characterization data signal 86 is used as an input to modify the page description for use on a specific type of hardcopy print device 10. Thus, the modifying step 92 may be different for an inkjet printer 10 (FIG. 1) than that for an electrophotographic printer (not shown), for example, such as Hewlett Packard Company's LasesJet® printers, because these two devices have different print characteristics. The modifying step 92 provides an instruction signal 94 which may operate on the page description data 56 to modify it in accordance with the type of printer in use. As with modifying step 92, controlling steps 88, 104, and 120, modifying steps 108 and 124, and characterization steps 80, 96, and 112 are all tailored to the unique characteristics of each type of hardcopy print device.

For instance, if black to color bleed control is to be handled on an object by object basis, then black objects that touch color, or fall within color regions, may have colors modified by step 92. In this case, step 92 insures the images are printed with the correct combination of CMYK to provide a good quality black without bleed into the "process black" of the (mixture of cyan, magenta and yellow) color regions. Another option is to use the black and color regions to control post processing of the black pixels in a later step to ensure process black is used where needed.

In another example, step 92 may adjust the line widths to provide maximum quality and accuracy of reproduction by the hardcopy output device. For instance, on the color inkjet printer 10, color lines that are one pixel wide and designated to be produced with halftoned colors often must be thickened to a two-pixel width to ensure that enough halftoned pixels are printed to fully render the line in its true color. In contrast, black lines or lines produced with solid colors usually do not require thickening.

In another example, step 92 could process photographic images with digital filters to sharpen the image, enhance edges, and remove noise from the image.

The control step 88 produces the control signal 90 based upon the current page characterization. Thus, the rasterizing step 60 may be modified to provide different rasterizations according to which region, textual 44, graphic 45, 46, or photographic 48, is being rasterized by step 60. Thus, each of the regions 44–48 may be rasterized in a customized fashion, according to image type.

The rasterization controlling step 88 may address other concerns. For example, if the page only contains scanned images 48 that are of relatively low resolution, the whole page may be rasterized at the lower resolution to maximize throughput without reducing print quality. If the page contains only grayscale shades as in graphic 45, then the page may be rasterized on the order of eight bits per pixel, using a gray palette for maximum throughput and quality.

As another example, the color objects 46, 48 may be tagged with color matching information (e.g. ColorSync® color matching produced by Apple Computer, Inc.), or if not so tagged, step 88 may perform this color matching operation before rasterization. Each color object 46, 48 may be color matched depending on what type of object it is. If these objects have already been tagged with color matching preferences, then these preferences may override automatic tagging commands of step 88, particularly if the commands were manually set, which ensures that the producer of the page description may control the type of color adjustment for each element on the page.

The color matching schemes employed by step 88 typically vary by object type. Photographic images 48 may be color matched with a human perceptual color matching scheme that ensures the colors match our memory colors (i.e. grass is the right shade of green and flesh colors come out correctly), provides good tone reproduction, and adjusts for colors that are outside of the normal gamut of colors produced by printer 10 for a lifelike image. For small text and line art, step 88 may adjust the colors for greater intensity and/or changes in hue so the resulting image is sharp, vivid and clear. For business graphics and business charts, step 88 may match colors for a pleasing combination of vibrancy, while also limiting the colors to prevent oversaturation or bleeding through the page, depending upon the actual printing technology employed by printer 10.

Step 88 may also operate to print objects with borders of a different intensity than the interior to provide both good edge definition and the required area saturation. This can be accomplished in QuickDraw® implementations, for instance, by modifying the border color in a different manner than the interior color. Alternatively, step 88 may divide a single object with a single color specification into two objects, then treat the border object as having one color, and the interior fill object as having a second color.

In a second data extraction and conditioning segment, the rasterized image data 64 is extracted via signal 66 to provide an input to a collecting and enhancing step 96. In step 96, additional statistics regarding the rasterized page image, sometimes also referred to as a bitmap, are collected and used to enhance the page first characterization data 84, received via signal 86. Using the rasterized data of the first characterization 84, allows additional refinement in the characterization of image 42. The output of the enhancing step 96 is supplied as signal 98 to define a second characterized data set 100.

The second characterized data set 100 is provided as signal 102 to a controlling halftoning parameters step 104. The output of step 104 is provided as a halftoning control signal 106 to the halftoning step 68. The signal 102 may be supplied as an input to an adjusting pixel image step 108 for post processing the rasterized page image data 64. In the adjusting step 108, the resulting pixel image signal 66 may be adjusted according to the specific attributes of the printer 10. As with the modifying step 92 above, the attributes of an inkjet printer 10 may be different from those of other types of hardcopy output devices, such as a plotter. For example, the resulting pixel image may be adjusted to include changing the colors to account for inaccuracies in the color reproduction of printer 10. For example, different types of ink formulations within the pens, particularly the color pen 20, may need adjustment to account for slight variations in hue.

The output of the adjusting step 108 is provided as a pixel adjustment control signal 110, which adjusts the rasterized image data 64 in this matter. Further color adjustments on the page may be accomplished by step 108. For instance, photographic regions 48 may be further adjusted now, and large regions of high saturation may be adjusted to control the amount of ink subsequently printed at step 75.

The post processing step 108 may include digitally filtering photographic regions 48 for smoothing, sharpening, resolution enhancement, and synthesis as needed. This filtering aspect of step 108 may only operate on photographic regions 48 which maximizes throughput and without modifying other areas of the page, such as the text 44, that would not benefit from digital filtering.

Other examples of functions which may be performed by the post processing adjusting step 108 include separating black and color areas for bleed control, if not done in previous steps at the object level. Additionally, steps 104 or 108 may smooth black data with a resolution enhancement algorithm. This step is particularly useful for printers like the DeskWriter 560C that have the capability to support a higher black resolution (600×300 DPI) than color resolution (300×300 DPI).

In step 104, the halftoning parameters are controlled based upon the second characterized data 100. For example, the halftoning step 68 may halftone the resulting resolution specific image for a specific pixel depth. Step 104 may accomplish this by digitally halftoning the image 42 using the appropriate halftoning technique for each region of the page. For instance, if users prefer business graphics 46 to be halftoned with a different technique than scanned photographs 48, then step 104 may accomplish this distinction by using the statistics collected from the page description and accumulated as data 84.

In step 96 the rasterized image or bitmap data 64 may be scanned to collect a variety of additional statistics. For example, if black to color bleed control was not done on an object by object basis, step 96 may scan the bitmap to separate the pure black regions from the regions that contain a mixture of touching black and color pixels. This information may be used in step 104 to halftone the black that falls within the color regions as a process black (mixture of cyan, magenta and yellow) and that which falls outside of the color regions as a true black. In step 96, the pure black regions may also be separated from the color regions for special processing. For example, as described earlier, resolution enhancement or smoothing may be applied in step 104 to the black regions to enhance the edge definition.

In a third data extraction and conditioning segment, a collecting and enhancing step 112 further enhances the data describing the selected image 42 using the halftoned page data 72, received via signal 74, in combination with the second characterization data 100, received via signal 102. The output of enhancing step 112 is provided as signal 114 to provide a third characterization data set 116. In step 112, the density of pixels on the page may be measured and used to control printing characteristics to ensure the best quality and highest throughput. For instance, if the page has a large area of dense color pixels, step 112 may direct printing with a higher shingling mode to reduce color bleed, or the printer may retain the following page longer before dropping it onto this dense page to assure adequate drying time. The term "shingling" refers to a mode of operation for printer 10 where the printer lays down only a percentage of the total ink dots available in a given print pass, and makes several passes to complete a raster. Shingling hides most nozzle inconsistencies and reduces the ink bleed. Also, this measuring of the amount of ink by step 112 may be used to warn when the ink cartridges 20, 22 are running low.

The third characterization data set 116 is supplied by signal 118 to a controlling of printing parameters step 120. Based upon this final characterization 116, controlling step 120 provides a printing control signal 122 to the print step 75. The signal 118 may also be supplied to a processing halftoned data step 124. In the processing step 124, the halftoned data may be processed to prepare it for the specific hardware of printer 10. It is apparent that this processing step may vary depending upon the type of printing device used, such as an inkjet printer 10 which has the capability to support a higher black resolution (600×300 DPI) than color resolution (300×300 DPI), versus a hardcopy printing device having the same resolution for both black and color. In this case, the inkjet printer could benefit from having the black data smoothed with a resolution enhancement algorithm, if not already done in an earlier step. The output of the processing step 124 is supplied as a processing control signal 126 to process the halftoned page image data 72 in this manner.

In step 120, areas that are pure black may be printed with different printer settings to maximize throughput, while color regions may be printed with settings to maximize quality. For instance, if the top half of a page contains only black text 44, then it may be printed without shingling (best for text), while color graphics 46 at the bottom of the page may require 50% shingling (best for color graphics) to print without noticeable defects. With earlier printing methods, the whole page would have to be printed with 50% shingling which slowed down the printer and possibly reduced the quality of the text at the top of the page.

The controlling step 120 may instruct printer 10 to hold onto a page before dropping it onto the previously printed page based upon the amount of ink on the previous page. Step 120 may select compression modes based on the type of data on the page to maximize throughput and minimize quality defects caused by the printer stopping printing and then restarting, a phenomenon often caused by a lack of data in the printer's input buffer. In another example of step 120, shingling may be controlled on a page by page basis, or on a region basis for pages that benefit from different shingling levels on different areas of the page.

Thus, the illustrated embodiment of this method controls the printing process in an optimal fashion by collecting statistics at steps 80, 96 and 112 from at the respective stages of print data 56, 64 and 72 on the type of document that is being printed. The steps 80, 96 and 112 use the collected data to characterize the images appearing on the hardcopy output 40 as textual images 44, grayscale images 45, color graphic images 46 or photographic images 48. At each stage, additional information is collected to refine the characterization of the document and reflect the page description transformation at each stage 52, 60 and 68 of the printing process. Additional information is extracted from subsequent stages and combined with the characterization from the previous stages to enhance this refinement.

Each of the characterized data sets 84, 100, 116 are linked together so that earlier characterizations are used in subsequent characterization steps. Advantageously, the illustrated characterization of the hardcopy output 40 allows the individual graphics elements 45, 46 and 48, as well as text 44, to be controlled independently. For example, the colors of the business graphics 45, 46 may be processed differently from those of the scenic photographic image 48. Thus, bright vivid colors may be used for the graphics 45, 46, whereas more realistic subtler tones may be used for the photographic image 48.

Other data flow control schemes may also be implemented. For example, in step 96 of FIG. 3, the pure black regions may be separated from regions having touching black and color pixels. The black ink data may be transferred via signal 98 to the second characterized data 100, while the color and processed black ink data may be returned to the main print stream via a return signal 66 for subsequent processing as a portion of rasterized page image data 64 at step 68. Alternatively, the black ink data may be separated and directed through steps 112 and 124 for addition to the halftoned page image data 72.

Figure 4:
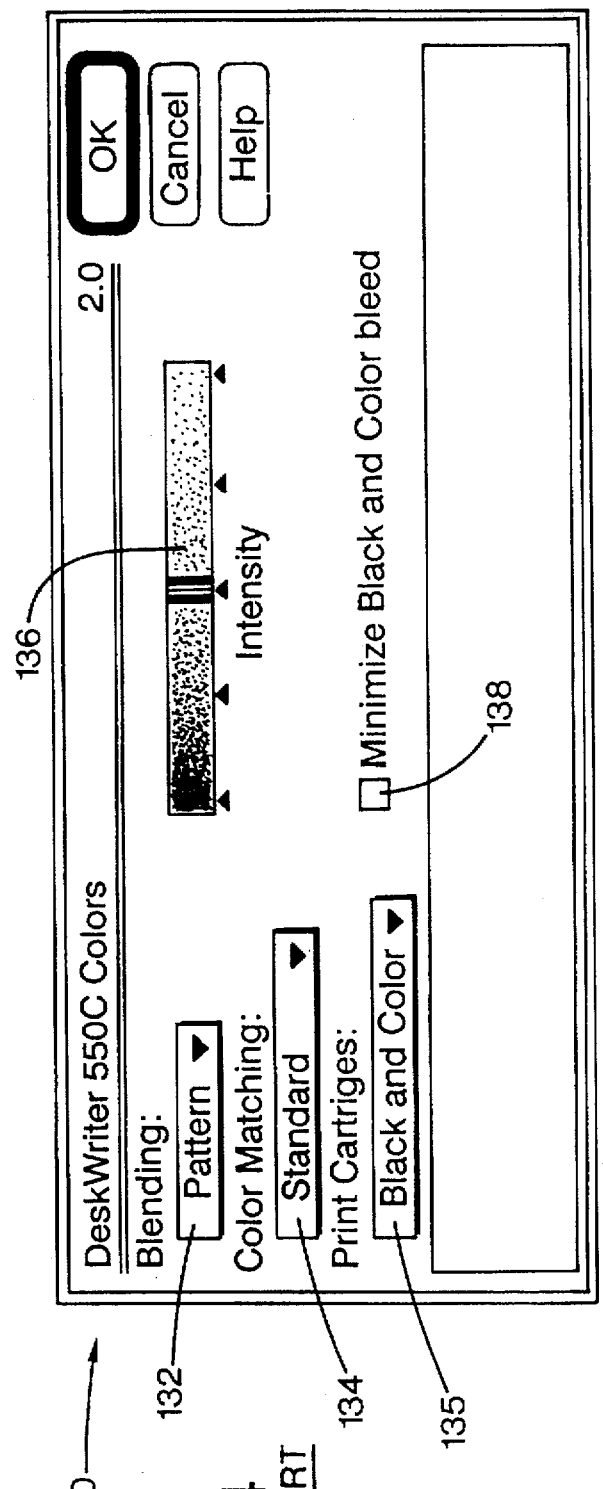
FIG. 4 is a reproduction of a prior art computer monitor display used with earlier color matching systems.

FIG. 4 illustrates a screen display 130 of a prior art printer, particularly, the Hewlett Packard Company's DeskWriter 550C model inkjet printer using driver software version 2.0. In the prior art system of screen 130, the color blending must be separately selected, here illustrated as being selected as a pattern 132. The color matching feature must also be selected, here illustrated as a standard selection 134. The print cartridges in use are also separately selected, here as black and color cartridges 135. An intensity selection 136 of the colors in another choice for the user to make. And finally, the operator must decide whether or not to minimize black and color bleed by either checking block 138 or leaving it blank as shown.

Figure 5:
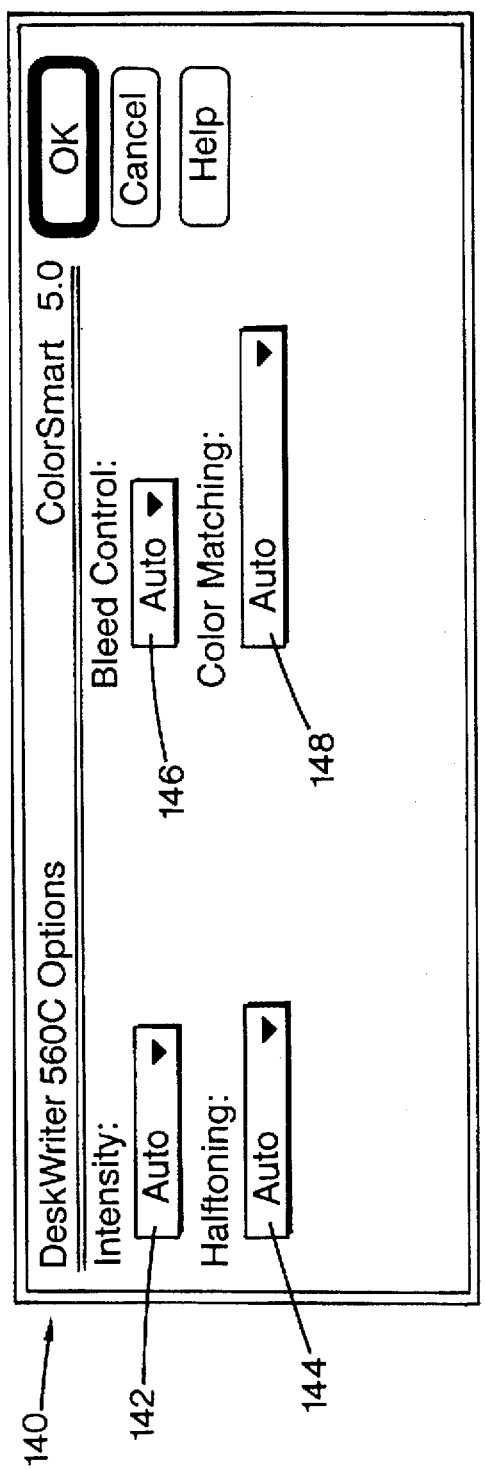
FIG. 5 is a reproduction of one form of a computer monitor display in accordance with the present invention.

FIG. 5 illustrates an embodiment of a monitor screen display 140 in accordance with the present invention. In particular, the screen display 140 shown appears on Hewlett Packard Company's DeskWriter® model 560C inkjet printer using driver software version 5.0, which has the configuration generally illustrated by printer 10. The illustrated screen 140 includes an intensity selection 142, a halftoning selection 144, a bleed control selection 146 and a color matching selection 148. If customized color is desired, and an operator wishes to separately adjust these characteristics, a variety of selections (not shown) are available, some of which may be in the same manner as illustrated in the prior art systems.

Advantageously, software embodying one form of the method of the present invention may be used to upgrade earlier printers originally sold without these capabilities. For example, the illustrated version 5.0 driver software may be used to upgrade the Hewlett Packard Company's DeskWriter® model 550C inkjet printer, described above with respect to FIG. 4.

One distinct advantage of the present invention is the availability of the "auto" selection for adjustments 142–148, as shown. This auto selection refers to the automatic color matching scheme illustrated by flow chart 50 which allows the various image regions 44–48 to be distinguished and tailored for color matching as described above. The requirements of the vast majority of users for clear vivid business graphics 46 with lifelike photographic images 48, may be easily obtained without requiring user involvement in setting the various color composition factors. Thus, sharp vivid hardcopy outputs 40 are obtained with minimal user involvement.

Moreover, in other screen displays (not shown), the system of the present invention also allows for the selection of printing colors in image 42 as a gray scale, a feature which was also available in earlier systems using only black ink. A grayscale version of the hardcopy output 40 may be particularly useful when transmitting the hardcopy image via facsimile for receipt on a black ink only facsimile machine. Other uses for a grayscale image include photocopying on a black ink only photocopy machine, and printing quick proof or draft copies of color documents The steps and processes of printer 10 described may be re-ordered. Other modifications may be adapted depending upon the printer involved, for instance, color matching may occur at the object level and/or at the rasterized page image level. Other steps may be added or modifications made to flowchart 50. For example, the statistics collection resulting in characterizations 84, 100 and 116, may be fed back upstream to affect future output or to cause the process to restart with the new information about the current page. For instance, if at the end of the process, step 75, it is discovered that the page that contains too many printed dots, then the process 50 may begin again with the image 42 being color adjusted to reduce the saturation of the page and hence the number of printed dots. Thus, operation of a hardcopy printer, such as printer 10, in accordance with the present invention enables the rendering and printing parameters to be optimized for each type of document. In fact, each component of a document such as those illustrated at 44–48, that comprise a mix of graphic elements may be individually optimized for each sheet printed.

We claim:

1. A method of controlling printing of a hardcopy using a hardcopy printing device having print characteristics, the method comprising the steps of:

supplying a page of a printing medium to the hardcopy printing device;

instructing the hardcopy printing device to print on the page a selected image having a combination of at least two elements comprising (a) textual material, (b) graphic images, or (c) photographic images;

distinguishing each element of the selected image as being either (a) textual material, (b) a graphic image, or (c) a photographic image;

collecting statistics for each distinguished element of the selected image; and in response to the distinguishing and collecting steps, adjusting the instructing step for each of the elements to be printed on the page to instruct the hardcopy printing device to (a) print any textual material according to a first set of parameters, (b) print any graphic image according to a second set of parameters, and (c) print any photographic image according to a third set of parameters.

2. A method according to claim 1 wherein:

the instructing step comprises plural printing stages; and the collecting and adjusting steps are repeated at each of the plural printing stages of the instructing step.

3. A method according to claim 2 wherein the collecting and adjusting steps comprise collecting statistics based upon an output of any previous adjusting steps.

4. A method according to claim 3 wherein at least one of the elements of the selected image may be a color image.

5. A method according to claim 4 wherein:

the hardcopy printing device comprises an inkjet printer having color printing capability; and the adjusting step comprises adjusting the color printing of the inkjet printer.

6. A method according to claim 1 wherein:

the instructing step comprises generating a data format representative of the selected image; and the distinguishing step comprises distinguishing the data format for each element as either pixel maps of data, geometric data, or textual data.

7. A method according to claim 1 wherein:

the instructing step comprises the step of generating a page description of the selected image; and the method further includes the step of modifying the page description in accordance with the print characteristics of the hardcopy printing device.

8. A method according to claim 7 wherein the modifying step comprises the step of imposing a minimum line thickness on the page description.

9. A method according to claim 7 wherein:

the instructing step comprises the step of rasterizing the page description to provide a pixel image; and the method further includes the step of adjusting the pixel image in accordance with the print characteristics of the hardcopy printing device to provide a resolution specific image.

10. A method according to claim 9 wherein the step of adjusting the pixel image comprises the steps of adjusting the colors in the pixel image.

11. A method according to claim 9 wherein the adjusting step comprises the steps of:

balancing two characteristics of the hardcopy printing device comprising a throughput characteristic and a print quality characteristic, wherein an increase in the throughput characteristic is achieved at a decline in the print quality characteristic, and an increase in the print quality characteristic is achieved at a decline in the throughput characteristic; and selecting a resolution in response to the balancing step.

12. A method according to claim 9 wherein:

the instructing step comprises the step of halftoning the resolution specific image to provide halftoned print data; and the method further includes the step of processing the halftoned print data in accordance with the print characteristics of the hardcopy printing device.

13. A method according to claim 1 wherein:

the instructing step comprises the steps of:

generating a page description of the selected image using a high level graphics language;

rasterizing the page description for a selected resolution to provide a pixel image; and halftoning the resolution specific image for a selected pixel depth to provide halftoned print data; and the method further includes the steps of modifying the generated page description, adjusting the rasterized pixel image to provide an enhanced image, and processing the halftoned print data, in accordance with the print characteristics of the hardcopy printing device.

14. A method according to claim 1 wherein:

the elements of the selected image comprise at least one grayscale image; and the step of collecting statistics further comprises the step of collecting statistics for each grayscale image.

15. A method according to claim 14 wherein:

the hardcopy printing device comprises an inkjet printer having monochrome printing capability; and the adjusting step comprises adjusting the monochrome printing of the inkjet printer for each element of the selected image.

16. A method according to claim 15, wherein:

the hardcopy printing device comprises an inkjet printer also having color printing capability; and the adjusting step also comprises adjusting the color printing of the inkjet printer.

17. A method according to claim 1 further including the steps of printing a sequence of plural hardcopy pages, and collecting statistics for each page.

18. A hardcopy printing device for printing on a page of a print medium a selected image having a combination of at least two elements comprising (a) textual material, (b) graphic images, or (c) photographic images, the hardcopy printing device comprising:

a chassis;

a print medium handling system housed in the chassis for supplying the print medium page to a printing zone;

a printhead that selectively deposits ink on the print medium page in the printing zone in response to a control signal; and a controller which generates the control signal in response to a data input defining a page description comprising a selected image having a combination of at least two elements comprising (a) textual material, (b) graphic images, or (c) photographic images, with the data input including statistics which are collected for each element of the selected image, with the data input having portions extracted and adjusted to characterize each of the elements to be printed on the page as either textual material, a graphic image or a photographic image to enhance the selected image when printed.

19. A hardcopy printing device according to claim 18 wherein the controller extracts and adjusts the portions of the data input to characterize each of the plural elements to be printed on the page as either textual material, a graphic image or a photographic image.

20. A hardcopy printing device according to claim 18 wherein the printhead comprises an inkjet printhead, and the hardcopy printing device comprises an inkjet printer.

21. A hardcopy printing device according to claim 20 wherein:

said printhead comprises a black ink printhead; and the inkjet printer further includes a second printhead comprising a color ink printhead.

22. A method according to claim 1 wherein the distinguishing step further includes the step of distinguishing a region of the selected image where two different plural elements touch one another.

23. A hardcopy printing device according to claim 20 further comprising a printhead carriage system that propels the inkjet printhead across the printing zone to selectively deposit ink on the print medium page in response to a control signal.

24. A hardcopy printing device according to claim 18 wherein the controller generates the control signal to instruct the hardcopy printing device to (a) print any textual material according to a first set of parameters, (b) print any graphic image according to a second set of parameters, and (c) print any photographic image according to a third set of parameters.

* * * * *